United States Patent [19]
Pasqualini

[11] Patent Number: 5,623,223
[45] Date of Patent: Apr. 22, 1997

[54] GLITCHLESS CLOCK SWITCHING CIRCUIT

[75] Inventor: Ronald Pasqualini, Los Altos, Calif.

[73] Assignee: National Semiconductor Corporation, Santa Clara, Calif.

[21] Appl. No.: 622,635

[22] Filed: Mar. 26, 1996

Related U.S. Application Data

[63] Continuation of Ser. No. 321,749, Oct. 12, 1994, abandoned.

[51] Int. Cl.⁶ ................................................ H03K 17/00
[52] U.S. Cl. ........................... 327/298; 327/99; 327/144
[58] Field of Search .................................. 327/18, 19, 24, 327/99, 144, 145, 146, 291, 298; 331/49

[56] References Cited

U.S. PATENT DOCUMENTS

| | | | |
|---|---|---|---|
| 4,965,524 | 10/1990 | Patchen | 327/298 |
| 5,099,141 | 3/1992 | Utsunomiya | 327/298 |
| 5,357,146 | 10/1994 | Heimann | 327/298 |

*Primary Examiner*—Timothy P. Callahan
*Assistant Examiner*—Jeffrey Zweizig
*Attorney, Agent, or Firm*—Limbach & Limbach L.L.P.

[57] ABSTRACT

A glitchless clock switching circuit utilizes a clock select input signal to determine which one of a plurality of clock input signals will be switched onto a clock output line. The clock select input signal and the multiple clock input signals may be completely asynchronous to each other.

13 Claims, 9 Drawing Sheets

LOGIC DIAGRAM OF THE GLITCHLESS CLOCK SWITCH (USING COMPLEX GATES)

FIG. 1
BLOCK DIAGRAM
OF THE GLITCHLESS
CLOCK SWITCH

FIG. 2 LOGIC DIAGRAM OF THE GLITCHLESS CLOCK SWITCH (USING COMPLEX GATES)

FIG. 2A LOGIC DIAGRAM OF THE GLITCHLESS CLOCK SWITCH (USING COMPLEX GATES) CLKA IS AUTOMATICALLY SELECTED AT POWER-ON RESET TIME

FIG. 2B LOGIC DIAGRAM OF THE GLITCHLESS CLOCK SWITCH (USING COMPLEX GATES) CLKB IS AUTOMATICALLY SELECTED AT POWER-ON RESET TIME

FIG. 3
OPERATIONAL FLOWCHART FOR THE GLITCHLESS CLOCKSWITCH

FIG. 4
SWITCHING WAVEFORMS FOR THE GLITCHLESS CLOCK SWITCHING CIRCUIT SHOWN IN FIG. 2

FIG. 5 LOGIC DIAGRAM OF THE GLITCHLESS CLOCK SWITCH (USING SIMPLE GATES)

FIG. 6
GLITCHLESS CLOCK SWITCH CONFIGURATION
FOR SWITCHING THREE CLOCKS

FIG. 7 SWITCHING WAVEFORMS FOR THE GLITCHLESS CLOCK SWITCHING CIRCUIT SHOWN IN FIG. 6

GLITCHLESS CLOCK SWITCHING CIRCUIT

This is a continuation of application Ser. No. 08/321,749 filed on Oct. 12, 1994, now abandoned by Ronald Pasqualini for Glitchless Clock Switching Circuit.

BACKGROUND OF THE INVENTION

1. Field of the Invention

The present invention relates to clock switching circuits and, in particular, to a glitchless clock switching circuit. This circuit allows all inputs, including both clock inputs and the clock select input, to be completely asynchronous to each other.

2. Discussion of the Prior Art

While glitchless clock switching circuits are well known in the prior art, each of these circuits suffers from at least one of the following disadvantages: use of asynchronous delays such as digital one shots, long clock switching latency, sensitivity to large clock buffer skew, incompatibility with scan based chip test and complex, non-minimal hardware implementation. The clock switching circuit of the present invention does not suffer from any of these disadvantages.

The glitchless clock switching circuit described below can be employed in a wide variety of applications. These applications include switching high/low speed clocks in microprocessors, switching reference clocks in phase locked loops and switching reference clocks in frequency synthesizers.

SUMMARY OF THE INVENTION

In accordance with the present circuit invention, a clock select input chooses which of two clock inputs will be switched onto a clock output line. All inputs to the clock switching circuit can be totally asynchronous to each other. Switching from the first clock to the second clock, and vice versa, is done without producing any pulse "glitches" on the clock output line. The input clocks can have arbitrary frequencies and arbitrary duty cycles. Clock switching occurs as fast as possible, consistent with the glitch-free clock switching requirement. The circuit uses output clock feedback to control all clock switching. This allows the circuit to function correctly, even in the presence of high clock buffer skew caused by slow clock edge rates and/or large load capacitance. The circuit uses only fully synchronous edge triggered logic and does not employ any asynchronous logic such as digital one shots or latches. This makes the circuit fully compatible with scan-based chip test, which is currently being adopted by almost all chip manufacturers. The circuit can be generalized to glitchlessly switch any number of clock sources onto a common clock output line. The circuit can also function as a "dumb clock mux" if required. (A "dumb clock mux" will immediately switch clock inputs, possibly generating glitches on the clock output line during the switching interval). Last, but not least, the circuit is implemented using a minimum amount of logic, allowing it to be employed in those applications where space is often extremely limited, such as inside I/O driver cells.

A better understanding of the features and advantages of the present invention will be obtained by reference to the following detailed description and accompanying drawings which set forth an illustrative embodiment in which the principles of the invention are utilized.

DETAILED DESCRIPTION OF THE INVENTION

Figure 1:
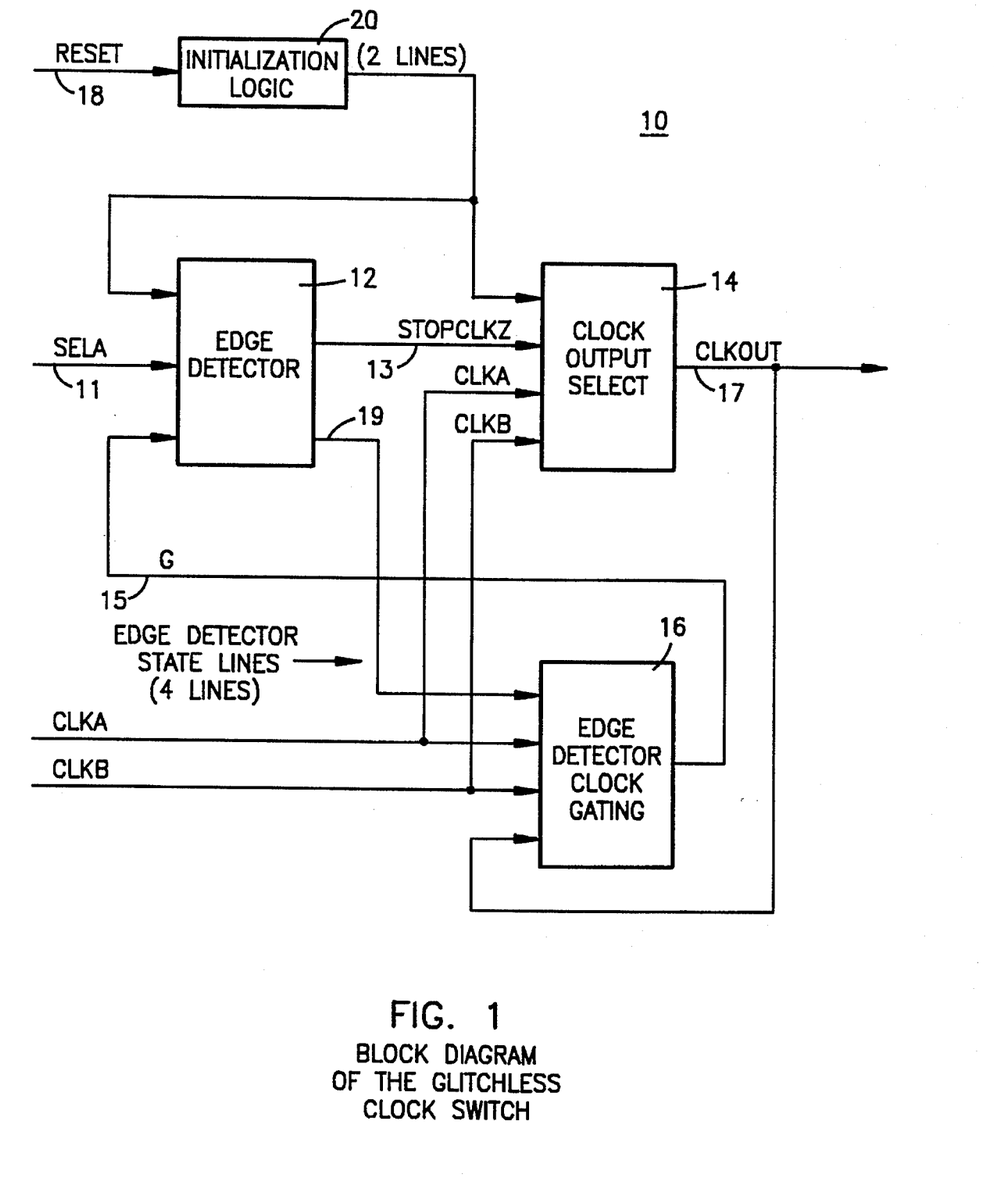
FIG. 1 is a block diagram illustrating a glitchless clock switching circuit in accordance with the present invention.

FIG. 1 shows a block diagram of the glitchless clock switching circuit (10), in accordance with the present invention. This circuit will switch the first clock input (CLKA), or the second clock input (CLKB), onto the CLKOUT line (17), according to the logic state of the SELA input (11). Specifically, when SELA goes from low to high, this indicates that CLKB should be disconnected from the CLKOUT line, and that CLKA should be connected. Conversely, when SELA goes from high to low, this indicates that CLKA should be disconnected from the CLKOUT line, and that CLKB should be connected. All clock switching is performed as quickly as possible, without producing any "glitches" on the CLKOUT line (17). (A "glitch" on the CLKOUT line is defined to be any pulse width shorter than the pulse width of CLKA or CLKB.)

As shown in FIG. 1, the glitchless clock switching circuit (10) consists of four blocks: an Edge Detector block (12), a Clock Output Select block (14), an Edge Detector Clock Gating block (16) and a Logic Initialization block. (20).

The Edge Detector (12) controls the state of the active low STOPCLKZ signal (13) in response to detected logic transitions on the SELA line (11). Thus, whenever CLKOUT goes from high-to-low, the SELA line is sampled by the Edge Detector, on the rising edge of the Edge Detector Clock (signal G). If a low-to-high or high-to-low logic transition has been detected on SELA (11), the STOPCLKZ signal (13) will be brought low, freezing CLKOUT (17) in the logic low state. After this occurs, no more clock pulses can occur on CLKOUT (17) until STOPCLKZ is subsequently brought high.

The Edge Detector Clock Gating block (16) produces a single output on signal line G (15), which serves as the clock input to the Edge Detector (12).

The Clock Output Select block (14) connects the CLKA input line, or the CLKB input line, to the CLKOUT line (17), without producing any "glitches" on the CLKOUT line.

The Logic Initialization block (20), which is optional in some applications, generates two complementary output signals which initialize two memory elements (flip-flops) located in the Edge Detector block (12) and one memory element located in the Clock Output Select block (14).

As described above, clock switching is performed according to detected logic transitions on the SELA input line (11). The SELA input line is sampled whenever CLKOUT goes from high-to-low. Thus, after the CLKOUT line has gone low, the following sequence will occur.

If a low-to-high transition of SELA has been detected, the CLKOUT line will be held low. The "old" clock (CLKB) will then be disabled, and the "new" clock (CLKA) will then be enabled, while CLKOUT is still being held low. The circuit will stop holding CLKOUT low, and the new clock (CLKA) will be connected to CLKOUT, only after the new clock has gone from low-to-high (or is presently high), and then goes from high-to-low. Thus, the new clock (CLKA) will be connected to CLKOUT only when the new clock is low.

Conversely, if a high-to-low transition of SELA has been detected when CLKOUT has gone from high-to-low, the following sequence will occur. First, as described in the previous paragraph, the CLKOUT line will be held low. Second, the "old" clock (CLKA) will then be disabled, and the "new" clock (CLKB) will then be enabled, while CLKOUT is still being held low. The circuit will stop holding CLKOUT low, and the new clock (CLKB) will be connected to CLKOUT, only after the new clock has gone from low-to-high (or is presently high), and then goes from high-to-low. Thus, as described in the previous paragraph, the new clock (CLKB) will be connected to CLKOUT only when the new clock is low.

If no change in SELA is detected when CLKOUT goes from high-to-low, the clock switching circuit (10) will continue to connect the "old" clock (CLKA or CLKB) to the CLKOUT line.

Those skilled in the art will appreciate that the clock switching sequence described above completely eliminates any possibility of generating "glitches" on the CLKOUT line.

Figure 2:
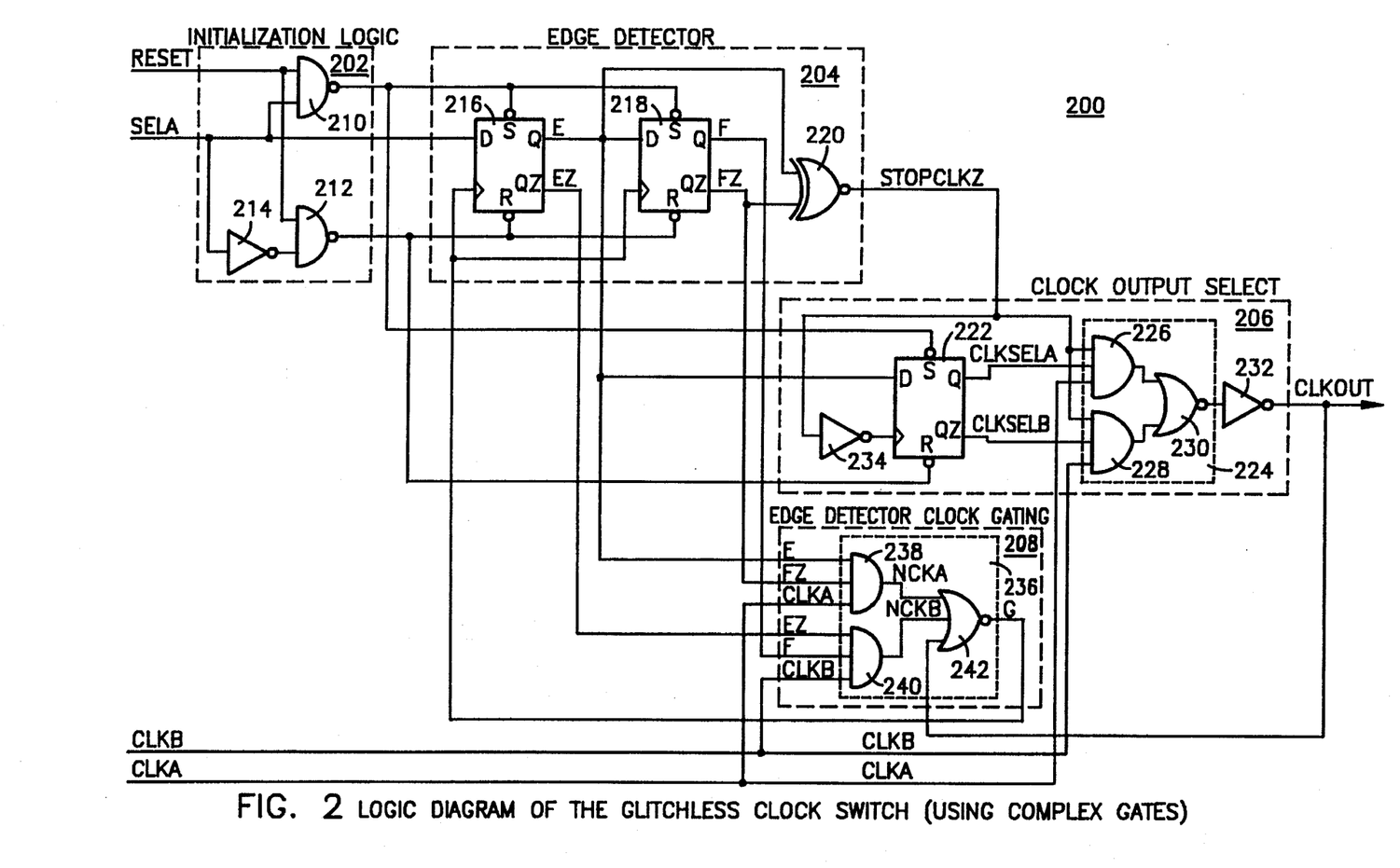
FIG. 2 is a logic diagram illustrating a glitchless clock switching circuit in accordance with the present invention.
Figure 2A:
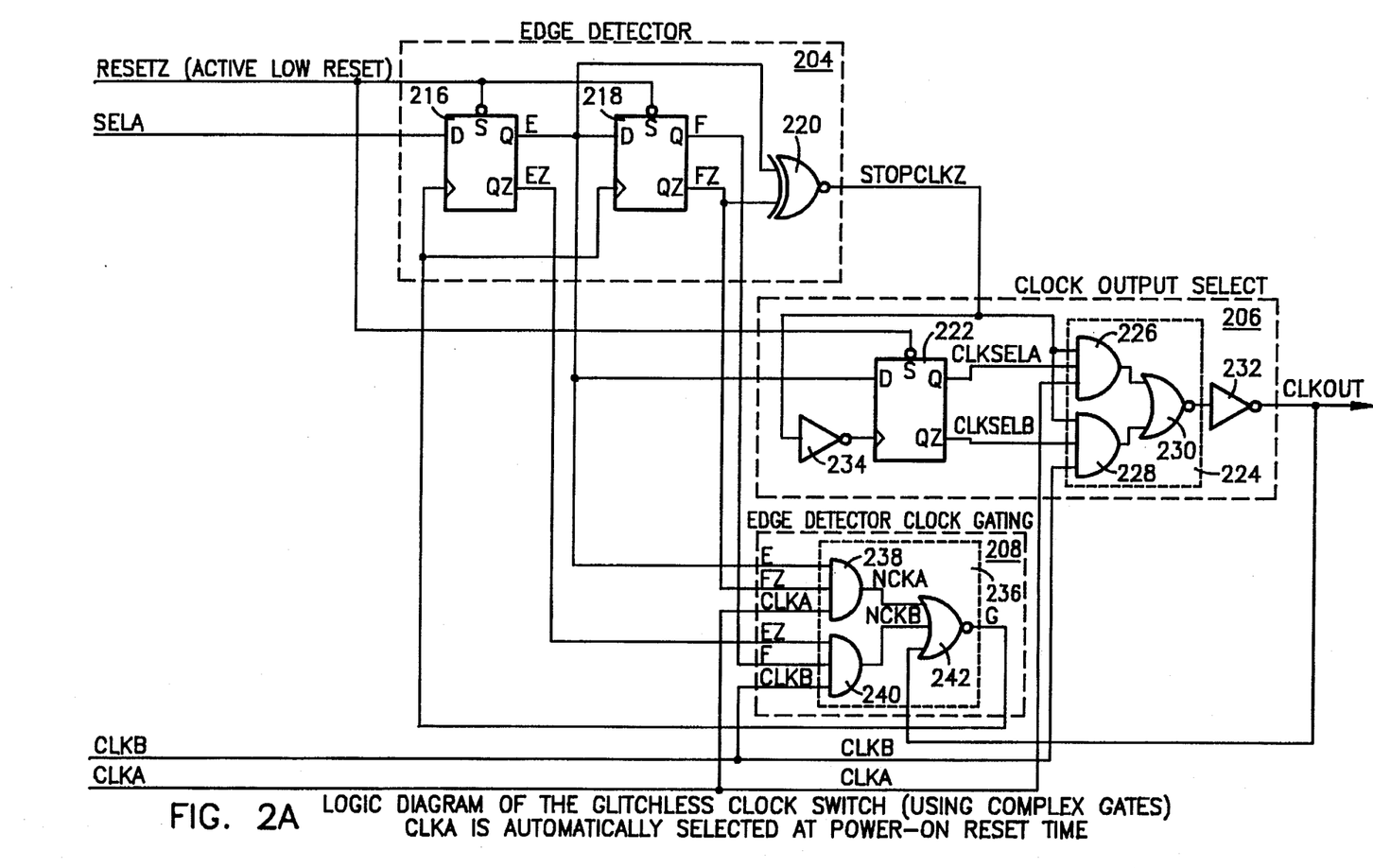
FIG. 2A is a logic diagram of an alternative circuit embodiment, in accordance with the present invention.
Figure 2B:
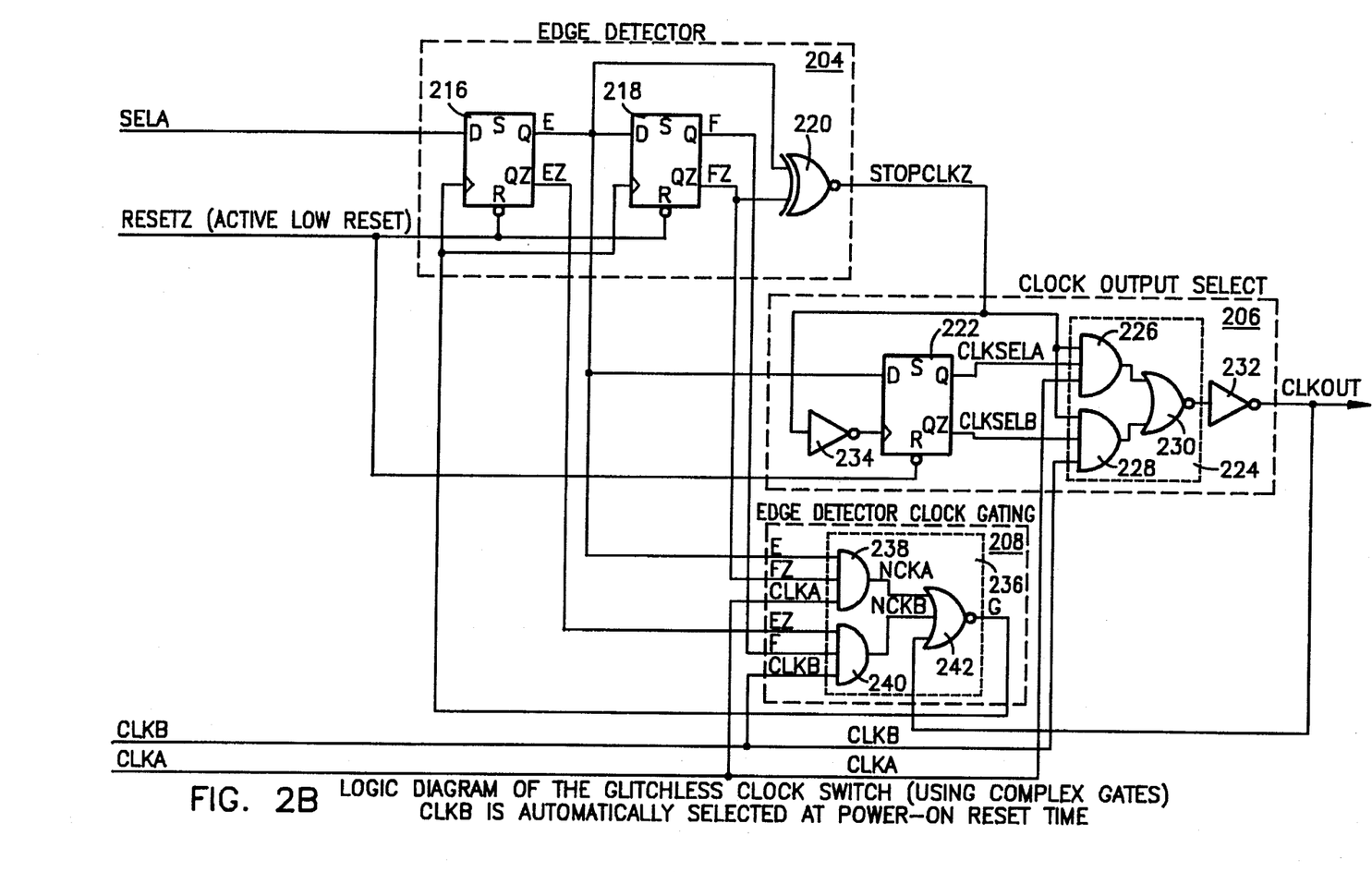
FIG. 2B is a logic diagram of a second alternative circuit embodiment, in accordance with the present invention.

The Circuit Initialization Logic (202) is shown in FIG. 2. This logic consists of NAND gate (210), NAND gate (212) and inverter (214). The Circuit Initialization Logic (202) determines which of the two clock input signals, CLKA or CLKB, will be connected to CLKOUT at power-on reset time. If the same clock signal (CLKA or CLKB) must always be selected at power-on reset, the Circuit Initialization Logic (202) is optional (i.e. it may be included, but it is not required). In order to illustrate this point, FIG. 2A shows an embodiment of a glitchless clock switching circuit in accordance with the present invention in which the FIG. 2 Circuit Initialization Logic (202) has been omitted because CLKA must always be selected at power-on reset. Similarly, FIG. 2B shows an embodiment of a glitchless clock switching circuit in accordance with the invention in which the FIG. 2 Circuit Initialization Logic (202) has been omitted because CLKB must always be selected at power-on reset. In summary, the FIG. 2 Circuit Initialization Logic (202) is only required when the initial clock selection at power-on reset is unknown (i.e. either CLKA or CLKB can be selected at power on reset).

Figure 3:
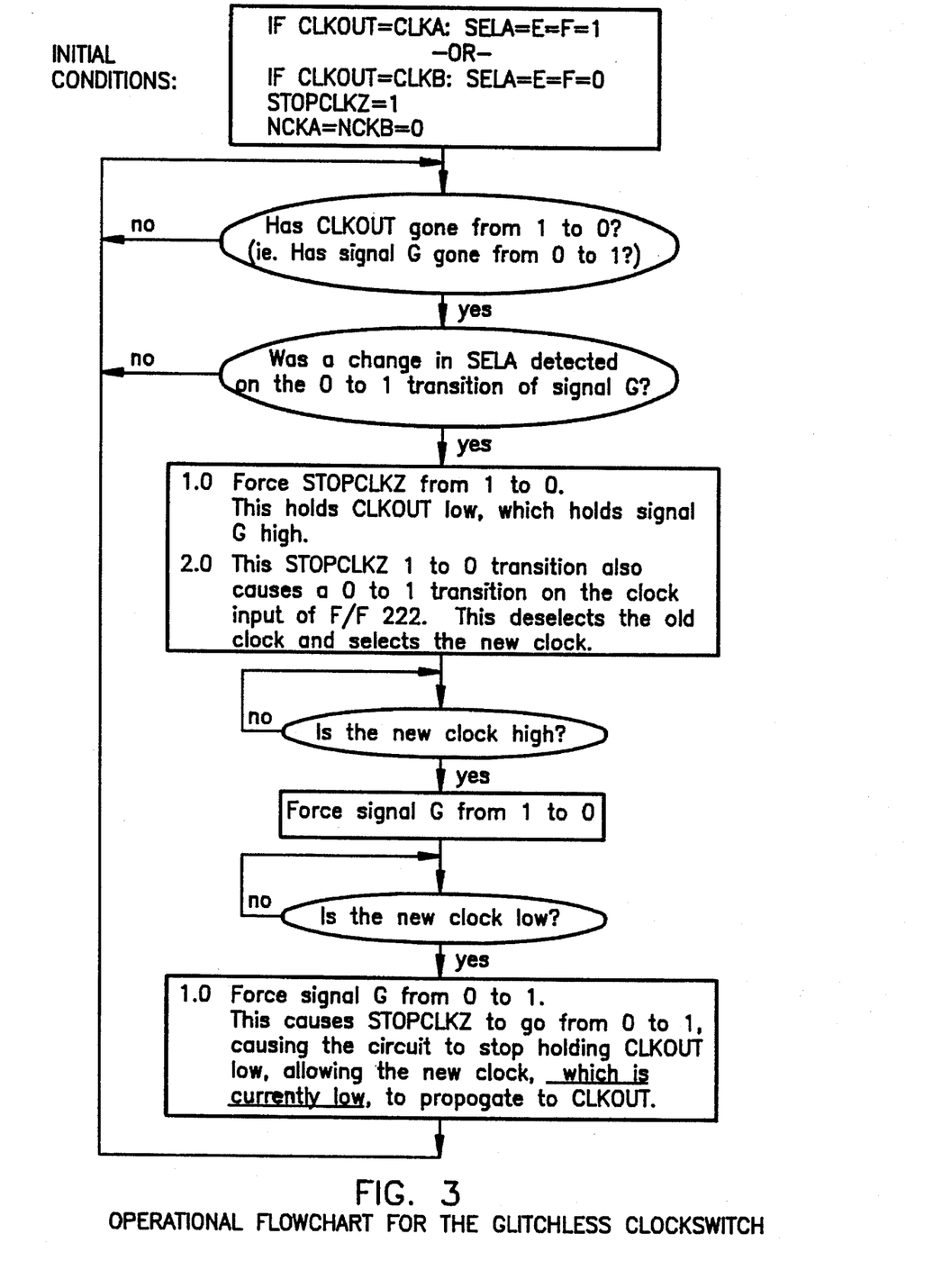
FIG. 3 is a flow chart illustrating the switching operation of the circuit shown in FIG. 2.
Figure 4:
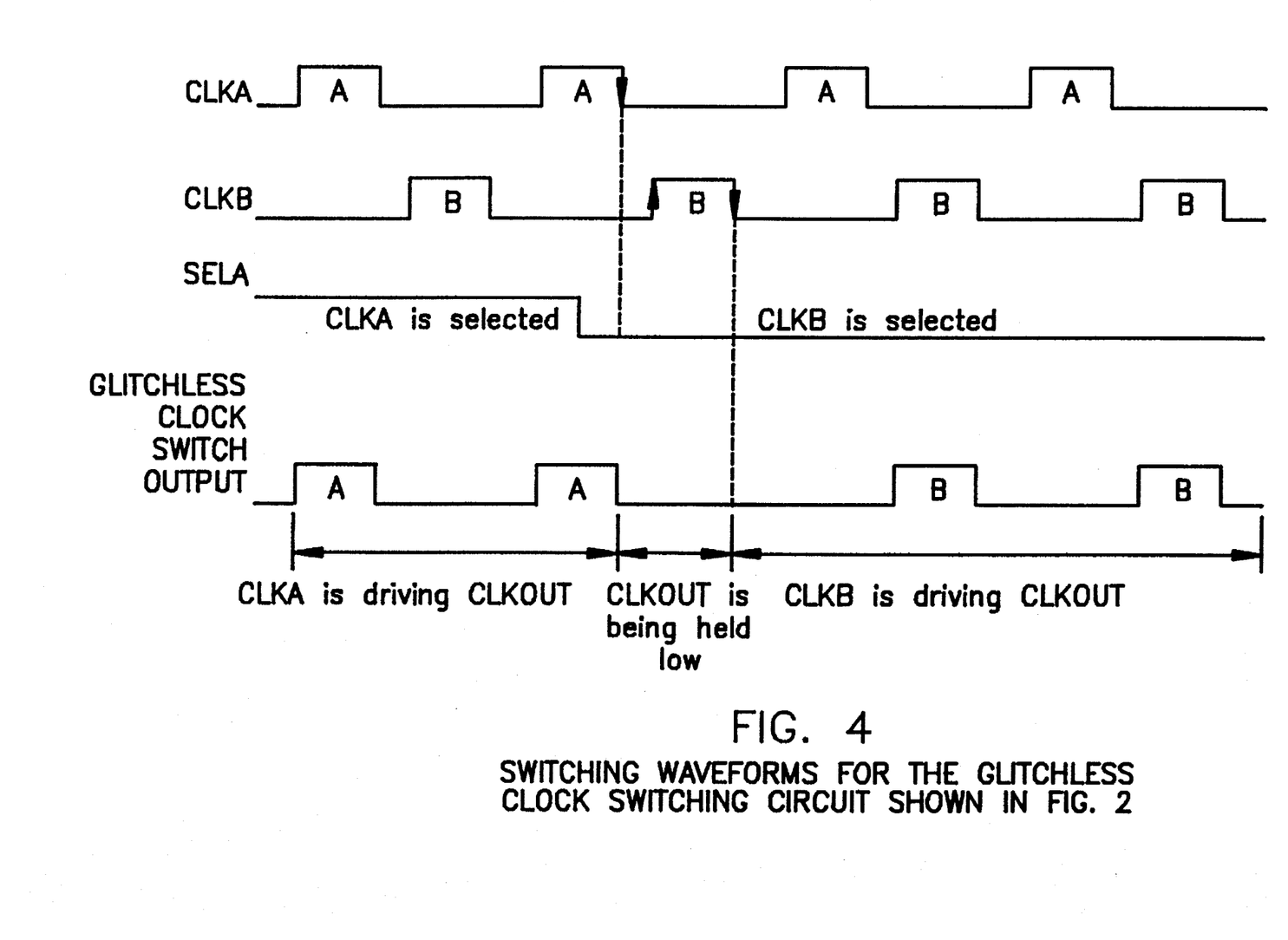
FIG. 4 is a timing diagram illustrating the switching operation of the circuit shown in FIG. 2.

As described above, the FIG. 2 Circuit Initialization Logic (202) includes two NAND gates (210 and 212) and an inverter (214). NAND gate (210) is driven by the power-on reset signal (RESET), and by the clock select signal (SELA). NAND gate (212) is also driven by the power-on reset signal (RESET), and by the logical complement of SELA, which is provided by inverter (214). With reference to FIG. 2 and to the flowchart shown in FIG. 3, if CLKA has been selected when the RESET signal is active (high), SELA will be high, the output of NAND gate (210) will be low, and the output of NAND gate (212) will be high. Similarly, if CLKB has been selected when the RESET signal is active (high), SELA will be low, the output of NAND gate (210) will be high, and the output of NAND gate (212) will be low.

As shown in FIG. 2, the output of NAND gate (210) and the output of NAND gate (212) are provided to the Edge Detector (204) and to the Clock Output Select Logic (206). Specifically, the output of NAND gate (210) drives the S(set) terminals of three edge-triggered flip-flops (216), (218) and (222). In addition, the output of NAND gate (212) also drives the R(reset) terminals of the same three flip-flops.

From the previous paragraph, it can be seen that if the SELA signal is set high upon circuit initialization, all three flip-flops will be set (their Q outputs will be high and their QZ outputs will be low). Thus, the following initial conditions will be established: SELA=E=F=CLKSELA=1, and EZ=FZ=CLKSELB=0. Under these initial conditions, the STOPCLKZ output of the XOR gate (220) will be forced high. These initial conditions allow CLKA pulses to be gated onto the CLKOUT line through AND gate (226), NOR gate (230), and inverter (232).

Conversely, if the SELA signal is set low upon circuit initialization, all three flip-flops shown in FIG. 2 will be reset (their Q outputs will be low and their QZ outputs will be high). Thus, the following initial conditions will be established: SELA=E=F=CLKSELA=0, and EZ=FZ=CLKSELB=1. Under these initial conditions, the STOPCLKZ output of the XOR gate (220) will once again be forced high, as in the previous paragraph. For this case, however, the CLKSELA line will be forced low, and the CLKSELB line will be forced high. These initial conditions allow CLKB pulses to be gated onto the CLKOUT line through AND gate 228, NOR gate 230, and inverter 232.

As shown in FIG. 2, the Edge Detector (204) simply consists of an exclusive OR gate (220) and two flip-flops (216 and 218) connected as a two bit shift register. The Edge Detector (204) is clocked by rising edge transitions of signal G, which is supplied by the Edge Detector Clock Gating block (208).

The following circuit description assumes that the circuit shown in FIG. 2 has been previously initialized at power-on reset as described above. For illustrative purposes, it is further assumed that CLKB is the "old" clock—i.e. the clock which is currently connected to the CLKOUT line. Thus, as described above, the following initial conditions are assumed to exist in the FIG. 2 circuit: RESET=SELA=E=F=CLKSELA=0, and EZ=FZ=CLKSELB=1. Since signal E is initially low and signal FZ is initially high, STOPCLKZ, the output of XOR gate (220), will be initially forced high. Furthermore, since CLKSELA is initially low, the output of AND gate (226) will be forced low. This causes NOR gate (230) to initially act as an inverter, inverting the output of AND gate (228). However, since STOPCLKZ and CLKSELB are both initially high, the CLKB signal will appear at the output of AND gate (228). Since NOR gate (230) is initially acting as an inverter as previously described, the CLKB signal will be inverted as it passes through NOR gate (230). Since the output of NOR gate (230) drives the input of inverter (232), the CLKB signal will then be inverted a second time, appearing on the CLKOUT line in its non-inverted form.

Since signal E is initially low, NCKA, the output of AND gate (238), will be initially forced low. Similarly, since signal F is initially low, NCKB, the output of AND gate (240), will also be forced low. Since NCKA and NCKB are both low, NOR gate (242) will initially act as an inverter. Thus, the CLKOUT signal will be inverted as it passes through NOR gate (242). As shown in FIG. 2, signal G, the output of NOR gate (242), drives the clock line of the Edge Detector (204). Thus, whenever the CLKOUT signal goes from high-to-low, the Edge Detector clock, signal G, will go from low-to-high. This causes the SELA input to be sampled, in order to detect a change in its logic state, each time that the CLKOUT signal (which is currently CLKB) goes from high-to-low.

The above discussion described how all circuit nodes in FIG. 2 are initialized, assuming that CLKB is currently being gated onto the CLKOUT line. How the circuit shown in FIG. 2 reacts to a low-to-high change on the SELA input line will now be discussed. This low-to-high change on SELA indicates that CLKA is to be the "new" clock output.

When SELA goes from low-to-high, nothing will happen until CLKOUT goes from high-to-low, causing the new logic state of SELA to be sampled by flip-flop (216). Thus, when CLKOUT goes from high-to-low, the Edge Detector clock (signal G), which clocks flip-flop (216), will go from low-to-high. Since SELA drives the D input of flip-flop (216), and since SELA is currently high, flip-flop (216) will change state (assuming that its setup time has been met). Thus, the rising edge of signal G will cause signal E to go from low-to- high, and the complement of signal E (signal EZ) to go from high-to-low. Since signal E is now high, and since signal FZ is still maintaining its initially high state, STOPCLKZ, the output of the XOR gate (220), will go from high-to-low.

When STOPCLKZ goes from high-to-low, two things happen. First, since STOPCLKZ is now low, this will insure that the outputs of AND gates (226) and (228) remain low. (These outputs were already both low before STOPCLKZ went low). Since the outputs of AND gates (226) and (228) both remain low, the output of NOR gate (230) will remain high, and CLKOUT, the output of inverter (232), will remain low. Thus, no more clock pulses can occur on CLKOUT until STOPCLKZ is subsequently brought high.

Secondly, since STOPCLKZ also drives the input of inverter (234), and since STOPCLKZ has gone from high-to-low, the output of inverter (234) will go from low-to-high. The output of inverter (234) clocks flip-flop (222). Since the D input of flip-flop (222) is connected to signal E, which was previously driven high, flip-flop (222) will change state shortly after STOPCLKZ has gone from high-to-low. This causes CLKSELA to go from low-to-high, and CLKSELB to go from high-to-low. Although CLKSELA and CLKSELB both change state at approximately the same time, a clock glitch will not be generated on the CLKOUT line. This is true because, at the time that CLKSELA and CLKSELB both change state, CLKOUT is already being held low by the STOPCLKZ signal, which was previously driven low.

Even though CLKSELA has been driven high, the newly selected clock (CLKA) cannot appear on the CLKOUT line until the presently low STOPCLKZ signal has been driven high. The only way for this to occur is to clock flip-flop (218) (and flip-flop 216) by generating a rising edge on signal G, the Edge Detector clock input. This can occur as described below.

It is important to note that signals E and FZ are both presently high, and that their complements, signals EZ and F, are both presently low. Since signals EZ and F are both low, they are both forcing NCKB, the output of AND gate (240), to remain low. However, since signals E and FZ are both high, they are partially enabling AND gate (238), whose output (NCKA) cannot become high until the "new" clock (CLKA) becomes high. (For simplicity of explanation, it is assumed that CLKA is presently low).

Since signals NCKA, NCKB and CLKOUT are all presently low, signal G, the output of NOR gate (242), will be high. This condition will persist until the newly selected clock, CLKA, goes high. This will cause NCKA, the output of AND gate (238) to go high, causing signal G, the output of NOR gate (242), to go low. This event acts as a precondition for subsequently allowing signal G to go high, clocking flip-flops (216) and (218). Signal G cannot go high, however, until the newly selected clock, CLKA, goes from high to low. When this occurs, flip-flop (216) and flip-flop (218) will both be clocked by the rising edge of signal G. This will cause flip-flop (218) to change state, while flip-flop (216) remains in its current state, due to the fact that the SELA signal is still being driven high. When flip-flop (218) changes state, signal F will go high, and its complement, signal FZ, will go low. Since signal E is currently high, and signal FZ is currently low, STOPCLKZ, the output of XOR gate (220), will go from low-to-high. This enables the "new" clock (CLKA) to be gated onto the CLKOUT line, by allowing CLKA to pass through AND gate (226), NOR gate (230) and inverter (232).

Although CLKA is now connected to the CLKOUT line, it is important to note that this has been accomplished while CLKA was in its low state. This completely eliminates the possibility of producing any "glitches" on the CLKOUT line during clock switching.

From the above discussion, it can be seen that flip-flops (216) and (218) not only form an edge detector, but also act as predictors of which clock (CLKA or CLKB) will be the "old" clock and which clock will be the "new" clock. This is shown in the following Table I:

TABLE I

| SIGNAL E | SIGNAL F | NEW CLOCK | OLD CLOCK |
| --- | --- | --- | --- |
| 0 | 1 | CLKB | CLKA |
| 1 | 0 | CLKA | CLKB |
| 0 | 0 | CLKB | CLKB |
| 1 | 1 | CLKA | CLKA |

Since flip-flops (216) and (218) act as clock predictors, they allow the Edge Detector clock (signal G) to be generated using minimal hardware (a single complex logic gate), as shown in FIG. 2.

The analysis of circuit operation, as described above, assumed that CLKB was the "old" clock and that CLKA was the "new" clock. Those skilled in the art will appreciate that a very similar analysis can be applied to the case where CLKA is the "old" clock and CLKB is the "new" clock.

Figure 5:
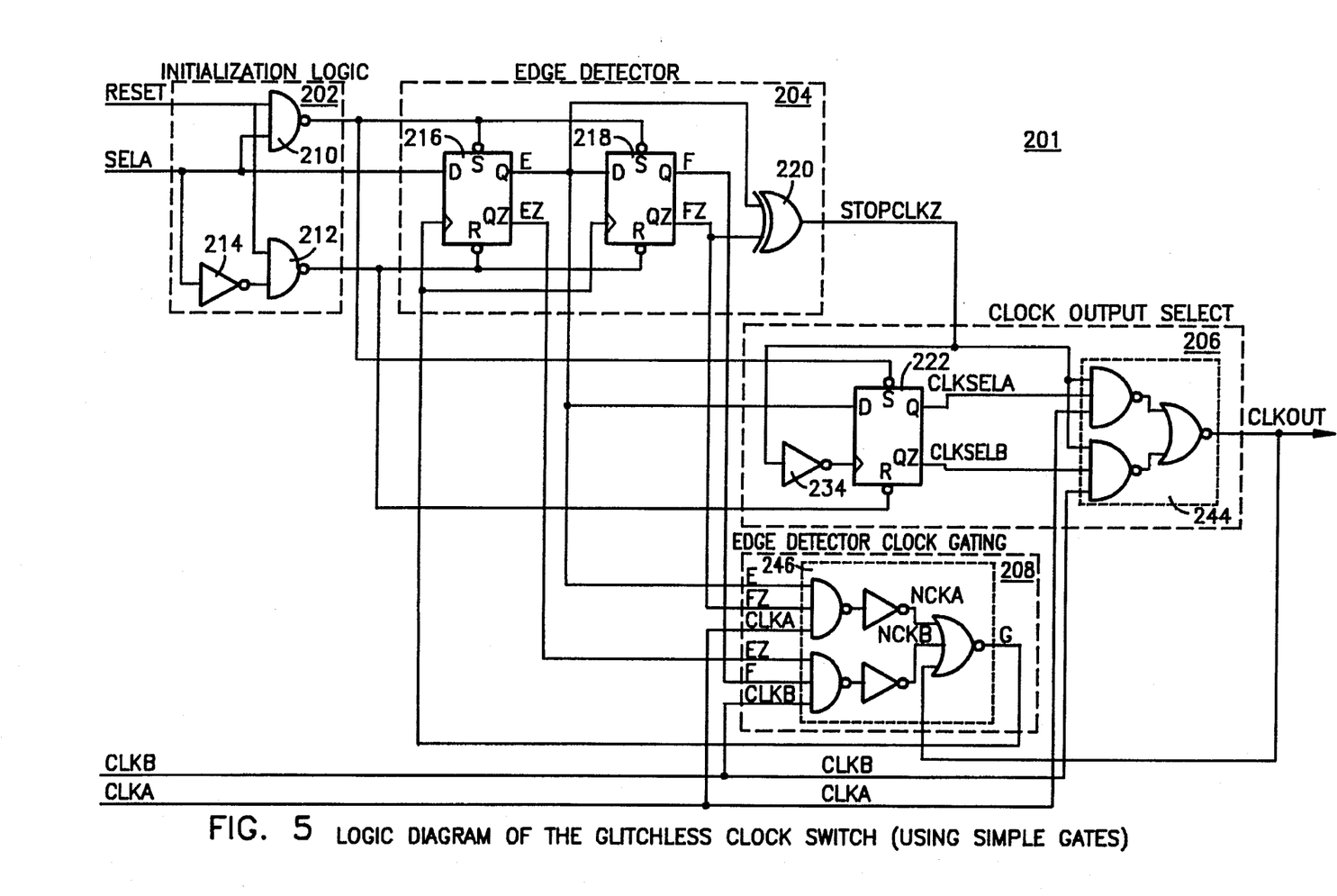
FIG. 5 is a logic diagram illustrating an alternative embodiment of the invention that utilizes simple logic gates in lieu of the complex logic gates employed in the circuit of FIG. 2.

FIG. 5 shows an alternative embodiment of the circuit (200) shown in FIG. 2. In the FIG. 5 embodiment, the two complex logic gates (224 and 236) shown in FIG. 2 have been replaced by two groups of simple logic gates (244 and 246). The FIG. 5 circuit implementation can be employed in those technologies where complex logic gates are not available. Those skilled in the art will appreciate the functional equivalency of the two circuit implementations shown in FIG. 2 and FIG. 5.

Figure 6:
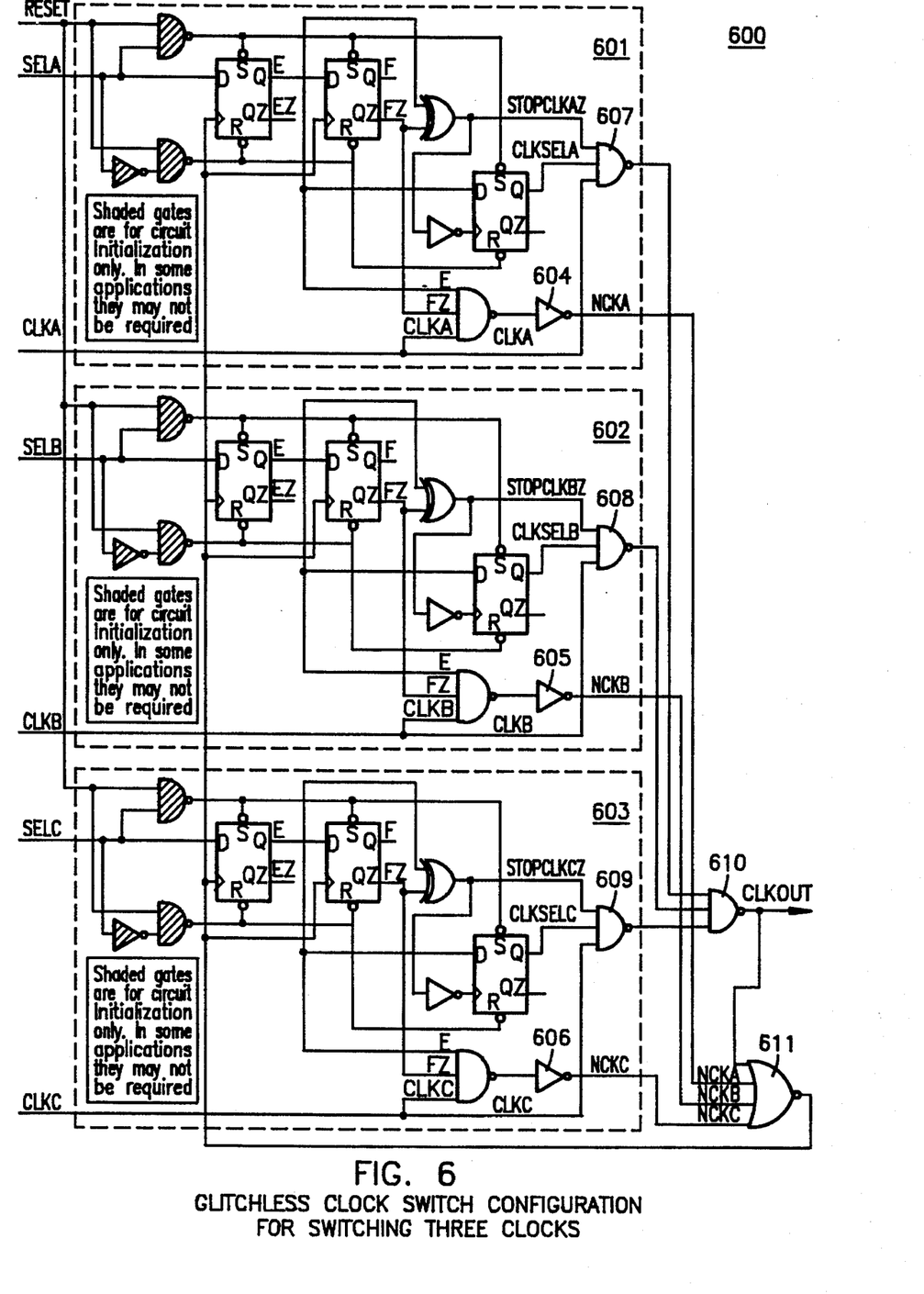
FIG. 6 is a logic diagram illustrating a glitchless clock switching circuit that switches three clock input signals onto a common clock output line, in accordance with the present invention.

FIG. 6 shows a third alternative embodiment (600) of the present circuit invention. This embodiment allows the user to switch among three clock input signals (CLKA, CLKB and CLKC), utilizing three clock select input signals (SELA, SELB and SELC). Those skilled in the art will appreciate that the operation of the FIG. 6 circuit (600) is very similar to the operation of the FIG. 2 circuit (200). They will also appreciate that the circuit shown in FIG. 6 can be generalized to switch any number of clock inputs in a glitchless fashion. Thus, for each additional clock input, the following hardware must be added: a block identical to block (601), one additional input to NAND gate (610) and one additional input to NOR gate (611). Of course, if the number of inputs to NAND gate (610) and NOR gate (611) becomes too large, the functional equivalent of these two gates can be implemented by using multiple logic gates, each of which has an acceptably small number of inputs.

Figure 7:
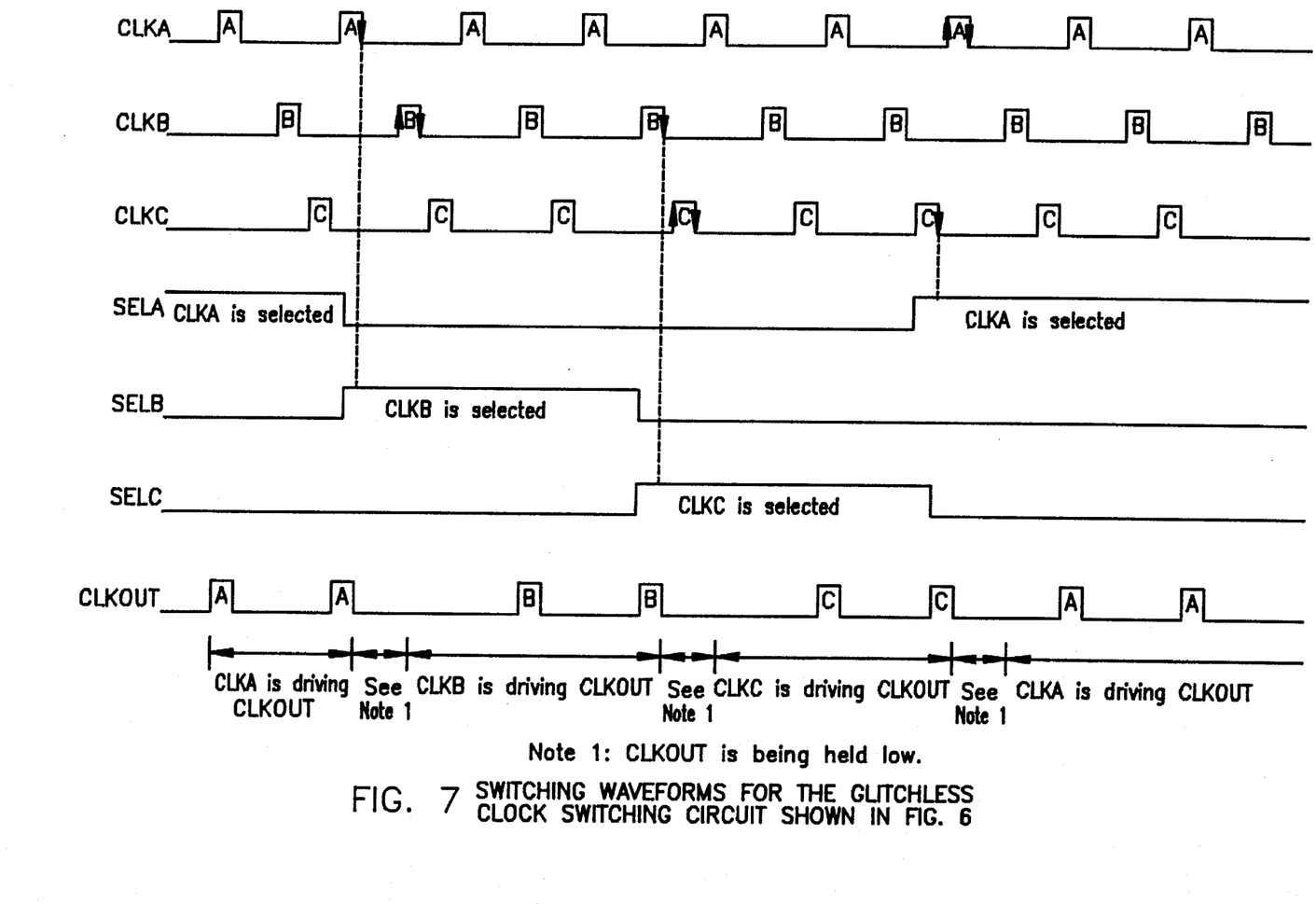
FIG. 7 provides a timing diagram illustrating the operation of the circuit shown in FIG. 6.

The clock select signals (SELA, SELB and SELC) shown in FIG. 6 are sampled on the high to low transition of CLKOUT. Since only one of these signals must be high at any given time, when these signals change value, one of them will be going low and one of them will be going high. Since CLKOUT is asynchronous to these signals, it is theoretically possible that they may sometimes be sampled at exactly the time when they are changing value. In this case, there is a small but finite possibility that the sampled value of more than one clock select signal will be high. This would cause more than one clock to be selected, causing circuit malfunction. In order to avoid this possibility, the clock select signals (SELA, SELB and SELC) should synchronized at the system level, so that they change value on the rising edge of CLKOUT. This will insure that these signals are stable (and only one of them is high), when they are sampled as shown in FIG. 6, on the falling edge of CLKOUT. A timing diagram for the FIG. 6 circuit (600) is provided in FIG. 7.

It should be understood that various alternatives to the embodiments of the invention described herein may be employed in practicing the invention. It is intended that the following claims define the scope of the invention, and that methods and circuits within the scope of these claims, and their equivalents, be covered thereby.

What is claimed is:

1. A glitchless clock switching circuit that responds to a logic transition of a clock select input signal from a first logic state to a second logic state by switching a clock output signal from providing a first input clock signal to providing a second input clock signal, the glitchless clock switching circuit comprising:

(a) edge detector circuitry that responds to the logic transitions of the clock select input signal by generating a logic transition on a stop-clock signal upon a logic state transition of an edge detector drive signal provided as an input to the edge detector circuitry;

(b) clock output select circuitry that receives the first and second clock input signals and the stop-clock signal, and when the stop-clock signal is in an inactive logic state, provides the first clock input signal or the second clock input signal as the clock output signal, and when the stop-clock signal is in an active logic state, holds the clock output signal in an inactive logic state, thereby disabling the clock output signal;

and wherein the edge detector circuitry includes (i) a first flip-flop that receives the clock select input signal at its data input and the edge detector drive signal at its clock input, and that provides a data output and a complementary data output;

(ii) a second flip-flop that receives the data output of the first flip-flop at its data input and the edge detector drive signal at its clock input, and that provides a data output and a complementary data output; and (iii) an XOR gate that receives the data output of the first flip-flop and the complementary data output of the second flip-flop as inputs and provides the stop-clock signal as an output; and (c) edge detector clock gating circuitry that includes (i) a first AND gate that receives the data output of the first flip-flop, the complementary data output of the second flip-flop and the first clock input signals as inputs and provides a first AND gate output;

(ii) a second AND gate that receives the complementary data output of the first flip-flop, the data output of the second flip-flip and the second clock input signal as inputs and provides a second AND gate output; and (iii) a first NOR gate that receives the first and second AND gate outputs and the clock output signal as inputs and provides the edge detector drive signal as an output.

2. A glitchless clock switching circuit as in claim 1 and wherein the clock output select circuitry includes a third flip-flop that receives the data output (E) of the first flip-flop at its data input and the stop-clock output signal, via an inverter, at its clock input, and provides a data output (CLKSELA) and a complementary data output (CLKSELB);

a third AND gate that receives the stop-clock output signal, the data output (CLKSELA) of the third flip-flop and the first clock input signal (CLKA) as inputs and provides a third AND gate output;

a fourth AND gate that receives the stop-clock output signal, the complementary data output (CLKSELB) of the third flip-flop and the second clock input signal (CLKB) as inputs and provides a fourth AND gate output; and a second NOR gate that receives the third and fourth AND gate outputs as inputs and provides the clock output signal via a second inverter.

3. A glitchless clock switching circuit as in claim 2 and further comprising initialization circuitry that includes a first NAND gate that receives the clock select input signal and a reset signal as inputs and that provides its output to the set input of each of the first, second and third flip-flops; and a second NAND gate that receives the complement of the clock select input signal and the reset signal as inputs and that provides its output to the reset input of each of the first, second and third flip-flips.

4. A glitchless clock switching circuit as in claim 2 and wherein an active low reset signal is provided to the set input of each of the first, second and third flip-flips whereby the first clock input signal (CLKA) is automatically selected as the output clock signal at power-on reset.

5. A glitchless clock switching circuit as in claim 2 and wherein an active low reset signal is provided to the reset input of each of the first, second and third flip-flops whereby the second clock input signal (CLKB) is automatically selected as the output clock signal at power-on reset.

6. A glitchless clock switching circuit as in claim 1 and further comprising initialization circuitry that receives a power-on reset input signal and that provides circuit initialization output signals that determine whether the first input clock signal or the second input clock signal will be connected as the output clock signal following power-on reset.

7. A glitchless clock switching circuit as in claim 6 and wherein the clock output select circuitry includes a third flip-flop that receives the data output (E) of the first flip-flop at its data input and the stop-clock output signal at its clock input via a third inverter, and provides a data output (CLKSELA) and a complimentary data output (CLKSELB);

a simple logic gate that includes a third NAND gate that receives the stop-clock output signal, the data output signal (CLKSELA) of the third flip-flop and the first clock input signal (CLKA) as inputs and provides a third NAND gate output;

a fourth NAND gate that receives the stop-clock output signal, the complimentary data output (CLKSELB) of the third flip-flop and the second clock input signal (CLKB) as inputs and provides a fourth NAND gate output; and a fifth NAND gate that receives the third and fourth NAND gate outputs as inputs and provides the output clock signal.

8. A glitchless clock switching circuit as in claim 7 and further comprising initialization circuitry that includes a sixth NAND gate that receives the clock select input signal and a reset signal as inputs and that provides its output to the set input of each of the first, second and third flip-flops; and a seventh NAND gate that receives the complement of the clock selected input signal and the reset signal as inputs and that provides its output to the reset input of each of the first, second and third flip-flops.

9. A glitchless clock switching circuit as in claim 7 and wherein an active low reset signal is provided to the set input of each of the first, second and third flip-flops whereby the first clock input signal (CLKA) is automatically selected as the output clock signal at power-on reset.

10. A glitchless clock switching circuit as in claim 7 and wherein an active low reset signal is provided to the reset input of each of the first, second and third flip-flops whereby the second clock input signal (CLKB) is automatically selected as the output clock signal at power-on reset.

11. A glitchless clock switching circuit that responds to a logic transition of a clock select input signal from a first logic state to a second logic state by switching a clock output signal from providing a first input clock signal to providing a second input clock signal, the glitchless clock switching circuit comprising:

(a) edge detector circuitry that responds to the logic transitions of the clock select input signal by generating a logic transition on a stop-clock signal upon a logic state transition of an edge detector drive signal provided as an input to the edge detector circuitry;

(b) clock output select circuitry that receives the first and second clock input signals and the stop-clock signal, and when the stop-clock signal is in an inactive logic state, provides the first clock input signal or the second clock input signal as the clock output signal, and when the stop-clock signal is in an active logic state, holds the clock output signal in an inactive logic state, thereby disabling the clock output signal;

and wherein the edge detector circuitry includes (i) a first flip-flop that receives the clock select input signal at its data input and the edge detector drive signal at its clock input, and that provides a data output and a complementary data output;

(ii) a second flip-flop that receives the data output of the first flip-flop at its data input and the edge detector drive signal at its clock input, and that provides a data output and a complementary data output; and (iii) an XOR gate that receives the data output of the first flip-flop and the complementary data output of the second flip-flop as inputs and provides the stop-clock signal as output; and (c) edge detector clock gating circuitry that includes (i) a first NAND gate that receives the data output of the first flip-flop, the complementary data output of the second flip-flop and the first clock output signal as inputs and provides a first NAND gate output;

(ii) a second NAND gate that receives the complementary data output of the first flip-flop the data output of the second flip-flop and the second clock input signal as inputs and provides a second NAND gate output; and (iii) a first NOR gate that receives the first and second NAND gate output as inputs via first and second inverters, respectively, and that also receives the output clock signal as an input, and that provides the edge detector drive signal as an output.

12. A glitchless clock switching circuit as in claim 11 and further comprising initialization circuitry that receives a power-on reset input signal and that provides a circuit initialization output signals that determine whether the first input clock signal or the second input clock signal will be connected as the output clock signal following power-on reset.

13. A glitchless clock switching circuit for switching a plurality of input clock signals, the clock switching circuit comprising:

for each of the plurality of clock input signals, a logic block that includes (a) a first flip-flop that receives a clock select input signal for said logic block at its data input and an edge detector drive signal (G) at its clock input, and that provides a data output (E);

(b) a second flip-flop that receives the data output (E) of the first flip-flip at its data input and the edge detector drive signal (G) at its clock input and that provides a data output (F) and a complimentary data output (FZ);

(c) an XOR gate that receives the data output (E) of the first flip-flop and the complimentary data output (FZ) of the second flip-flop as inputs and provides a stop-clock output signal as an output;

(d) a first NAND gate that receives the data output (E) of the first flip-flop, the complimentary data output (FZ) of the second flip-flop and said clock input signal as inputs and provides a first NAND gate output via a first inverter;

(e) a third flip-flop that receives the data output (E) of the first flip-flop at its data input and the stop-clock output signal, via an inverter, at its clock input, and provides a data output; and (f) a second NAND gate that receives the stop-clock output signal, the data output of the third flip-flop and said clock input signal as inputs and provides a second NAND gate output;

a NOR gate that receives the output of the first inverter of each logic block as inputs and provides the edge detector drive signal (G) as an output; and an output NAND gate that receives the output of the second NAND gate of each logic block as inputs and provides the output clock signal.

\* \* \* \* \*